Patented Nov. 5, 1929

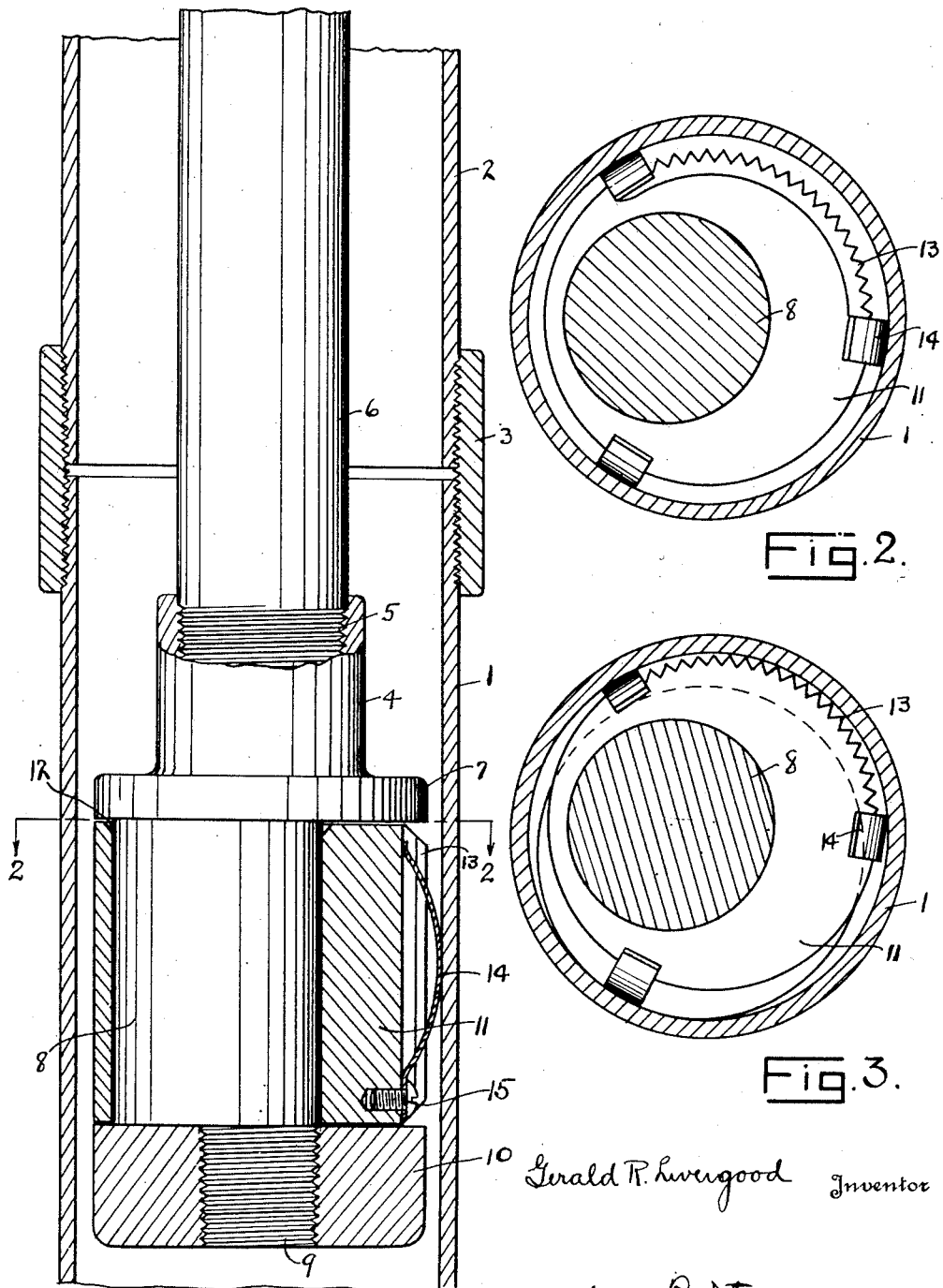

1,734,439

UNITED STATES PATENT OFFICE

GERALD R. LIVERGOOD, OF HOUSTON, TEXAS

INTERIOR PIPE WRENCH

Application filed April 5, 1926. Serial No. 99,909.

My invention relates to a pipe engaging means adapted to be inserted into a pipe and connected therewith to form a wrench by means of which the pipe may be held non-rotatably relative thereto.

In handling pipe in well drilling, it sometimes becomes necessary to disconnect sections of pipe at the upper end of the string of casing while the remainder of the pipe is in the well. It is difficult to do this for the reason that the whole string of pipe in the well may rotate, or, if not, the upper sections may unscrew from the sections lower down at a joint where the uncoupling is not desired.

It is an object of my invention to provide a pipe gripping device to be inserted down into a string of casing, or other pipe in a well and act to hold the lower sections stationary while the upper section or sections are unscrewed therefrom for removal. It is desired that the tool be simple and strong, and also positive and reliable in its performance.

Referring to the drawing herewith, Fig. 1 is central longitudinal section through a well pipe showing my device therein in side elevation, certain parts being broken away for greater clearness. Fig. 2 is a transverse section on the plane 2—2 of Fig. 1. Fig. 3 is a similar section showing the parts in pipe engaging position. Like numerals of reference are employed to designate like parts in all the views.

The drawing illustrates my device as employed within a casing 1. The upper joint 2 is connected thereto by a coupling 3 of the usual construction. The wrench is shown as inserted downwardly below the coupling to engage the pipe below the joint and hold it against rotation.

The wrench comprises a head 4, the upper end of which is formed with a threaded socket for connection with a stem 6, which may be an ordinary drill stem, extending to the surface. A radial flange 7 is formed on the head below the socket and below this flange the head is offset from the central axis to provide an eccentric bearing member 8. Below the eccentric bearing the diameter of the head is reduced and formed with a central threaded shank 9. Screwed upon the shank 9 is a circular nut 10 of the same diameter as the flange 7 and aligned therewith. Between the nut 10 and the flange 7 is the gripping ring 11. It is mounted rotatably upon the eccentric bearing and has an eccentric bearing opening 12 therein to fit said bearing. When in neutral position, as is shown in Fig. 2, the gripping ring is aligned with the axis of the pipe and out of engagement therewith. One sector of the periphery of the gripping ring is provided with vertical teeth 13 to engage the casing.

The ring is held against rotation in the casing by means of a plurality of spaced springs 14 secured at their lower ends to the ring by means of screws 15 or other similar means. The springs are bowed outwardly and the upper ends are slidable along the face of the head. It is to be understood that the springs bear strongly against the casing and resist any tendency of the ring to rotate therein.

When it is desired to grip the casing 1 to prevent its rotation, the stem 6 is rotated in either direction, ordinarily in a right-hand or clockwise direction. This gives the eccentric bearing head 8 a planetary movement forcing the teeth 13 into the casing and gripping it firmly, and tending, if the rotation of the wrench is continued, to rotate the casing in a right-hand direction.

When the casing 1 is thus held, the upper section 2 may be gripped at the surface by any form of casing tongs and rotated in a left-hand or counter-clockwise direction to unscrew it from the coupling so that it may be withdrawn to be cut or worked upon and then, if desired, again inserted and again screwed into the coupling.

The wrench thus formed is positive and certain in its action and serves to make the unscrewing of pipe sections from each other, while in the well, an easy matter. Its advantages will be understood by those skilled in the art.

What I claim as new and desire to protect by Letters Patent is:

1. A pipe gripping wrench adapted to be inserted downwardly within a pipe axially thereof, an eccentric bearing member thereon, a gripping ring eccentric relative to said bearing member, there being peripheral teeth on said ring, additional means carried by said ring adapted to engage said pipe to hold said ring against rotation in said pipe, and means to rotate said member.

2. A pipe gripping wrench for engaging the interior of a pipe, comprising a stem, a head thereon, an eccentric bearing member on said head, a ring on said bearing member, normally concentric with said stem, there being teeth on said ring and additional means to resist rotation of said ring, said additional means including leaf springs carried by the periphery of said ring.

3. A pipe gripping wrench for engaging the interior of a pipe, comprising a stem, a head thereon including a radial flange, an eccentrically mounted bearing member below said flange, a nut below said bearing member, and a pipe gripping means free to rotate on said bearing member, and means adapted to engage the pipe to prevent rotation of said first means when said stem is rotated.

4. A pipe gripping wrench for engaging the interior of a pipe, comprising a stem, a head thereon, an eccentrically mounted gripping ring thereon, means normally engaging the pipe to resist rotation of said ring and teeth on said ring.

In testimony whereof I hereunto affix my signature this 31st day of March, A. D. 1926.

GERALD R. LIVERGOOD.